US012637283B1

(12) United States Patent
Fitzgerald

(10) Patent No.: US 12,637,283 B1
(45) Date of Patent: May 26, 2026

(54) SYSTEM, APPARATUS, AND METHOD FOR ON-SITE TRASH COMPACTION

(71) Applicant: Pinnacle Design Consulting LLC, Sandy Hook, VA (US)

(72) Inventor: Michael Fitzgerald, Sandy Hook, VA (US)

(73) Assignee: Pinnacle Design Consulting LLC, Sandy Hook, VA (US)

( * ) Notice: Subject to any disclaimer, the term of this patent is extended or adjusted under 35 U.S.C. 154(b) by 0 days.

(21) Appl. No.: 19/373,217

(22) Filed: Oct. 29, 2025

(51) Int. Cl.
*B65F 1/14* (2006.01)
*B30B 9/30* (2006.01)

(52) U.S. Cl.
CPC .......... *B65F 1/1405* (2013.01); *B30B 9/3042* (2013.01); *B65F 1/1473* (2013.01)

(58) Field of Classification Search
CPC ... B30B 9/3042; B30B 9/3046; B65F 1/1405; B65F 1/1473
See application file for complete search history.

(56) References Cited

U.S. PATENT DOCUMENTS

| | | | | | |
|---|---|---|---|---|---|
| 4,344,272 | A * | 8/1982 | Gaudette | A01D 85/004 | 56/28 |
| 4,716,825 | A * | 1/1988 | Lemmond | B30B 9/3042 | 173/28 |
| 5,365,837 | A | 11/1994 | Lowery | | |
| 5,386,767 | A | 2/1995 | Edinburgh | | |
| 6,367,377 | B1 | 4/2002 | Gawley | | |
| 7,100,500 | B2 | 9/2006 | Soler | | |
| 8,578,846 | B2 * | 11/2013 | Sherwood | B30B 9/3021 | 100/35 |
| 11,400,677 | B2 | 8/2022 | Husmann | | |
| 2017/0064980 | A1 | 3/2017 | Graus | | |
| 2022/0332075 | A1 * | 10/2022 | Kachkovsky | B30B 1/16 | |
| 2025/0214766 | A1 | 7/2025 | Boivin | | |
| 2025/0242561 | A1 | 7/2025 | Attisha | | |

FOREIGN PATENT DOCUMENTS

WO 2016049707 A1 4/2016

* cited by examiner

*Primary Examiner* — Jimmy T Nguyen
(74) *Attorney, Agent, or Firm* — Keefe IP Law, PLLC

(57) ABSTRACT

A mobile apparatus for compacting trash in a receptacle is disclosed. The mobile apparatus has a drive assembly attached between a structural assembly and a carriage assembly, and a compactor supported at the carriage assembly. The carriage assembly is configured to be removably attached to the receptacle. The drive assembly is configured to move the carriage assembly to a plurality of positions along a length of the receptacle. The compactor is configured to compact the trash in the receptacle at the plurality of positions.

19 Claims, 5 Drawing Sheets

SYSTEM, APPARATUS, AND METHOD FOR ON-SITE TRASH COMPACTION

TECHNICAL FIELD

The present disclosure generally relates to a system, apparatus, and method for trash compaction, and more particularly to a system, apparatus, and method for on-site trash compaction.

BACKGROUND

Dumpsters such as construction and debris dumpsters are commonly used during construction and renovation projects for example in residential and commercial construction and renovation. Typical construction and debris dumpsters range from 10 or 15 cubic yards to 30 or 40 cubic yards. 30 cubic yard dumpsters are often used because their wall heights at 6 feet are manageable for use by workers.

Most on-site dumpsters are hand-loaded by the trades workers using them. Some are also loaded using machines such as skid steer loaders, forklifts, and excavators. In both cases, whether hand-loading or machine loading, significant void spaces are created within the debris loaded in the dumpster, resulting in the dumpster not being used or filled efficiently. That is, the void spaces significantly reduce the amount of actual debris that can fit in the dumpster, increasing the number of dumpster loads that are used to remove debris from a given location, thereby raising costs.

One attempt to address these shortcomings in conventional technology is set forth in U.S. Pat. No. 6,367,377 to Gawley (the '377 patent). The '377 patent discloses a compactor that is moved over a receptacle and then operated to vertically actuate to reduce void space in the receptacle by compacting trash in that receptacle. However, the '377 patent fails to provide an efficient and effective technique for compacting trash in on-site receptacles of varying shapes including for example relatively large dumpsters.

Accordingly, a need in the art currently exists for efficiently utilizing and filling on-site trash receptacles such as dumpsters.

The exemplary disclosed system, apparatus, and method of the present disclosure are directed to overcoming one or more of the shortcomings set forth above and/or other deficiencies in existing technology.

SUMMARY OF THE DISCLOSURE

In one exemplary aspect, the present disclosure is directed to a mobile apparatus for compacting trash in a receptacle. The mobile apparatus includes a drive assembly attached between a structural assembly and a carriage assembly, and a compactor supported at the carriage assembly. The carriage assembly is configured to be removably attached to the receptacle. The drive assembly is configured to move the carriage assembly to a plurality of positions along a length of the receptacle. The compactor is configured to compact the trash in the receptacle at the plurality of positions.

In another aspect, the present disclosure is directed to a for compacting trash in a receptacle using a mobile apparatus. The method includes transporting the mobile apparatus to a geographic location of the receptacle, removably attaching a carriage assembly of the mobile apparatus to the receptacle, moving the carriage assembly to a plurality of positions along a length of the receptacle while the carriage assembly is removably attached to the receptacle, and compacting the trash in the receptacle at the plurality of positions using a compactor supported at the carriage assembly.

DETAILED DESCRIPTION AND INDUSTRIAL APPLICABILITY

The exemplary disclosed system, apparatus, and method may provide for compacting trash in on-site trash receptacles so that significantly more trash may be disposed in a given trash receptacle before it is transported off-site (e.g., to a landfill or other disposal site). The exemplary disclosed apparatus may be a towable apparatus (e.g., or self-propelled apparatus) that may be towed by a vehicle to a location of an on-site dumpster. The towable apparatus may include a structural assembly that may movably support a carriage assembly supporting a compactor. The carriage assembly may be driven by a drive assembly attached between the structural assembly and the carriage assembly. As described further below, the carriage assembly may be movably attached to a given trash receptacle as the carriage assembly is driven by the drive assembly and as the compactor operates to compact trash in the trash receptacle at different positions along a length of the receptacle. The structural assembly may help support the drive assembly and the carriage assembly, with the structural assembly for example further stabilized by outriggers that may be lowered to the ground to provide additional stability as further described below. The drive assembly may extend and retract to move the carriage to desired positions along a length of the trash receptacle. For example, the drive assembly may drive the carriage assembly along a length of the trash receptacle, stopping at suitable intervals so that the compactor may operate to compact the trash in the receptacle. For example, a series of compactions may be performed based on the drive assembly iteratively moving the carriage a suitable distance (e.g., interval) and the compactor operating to compact (e.g., move downward to compact) the trash in the receptacle.

Figure 1:
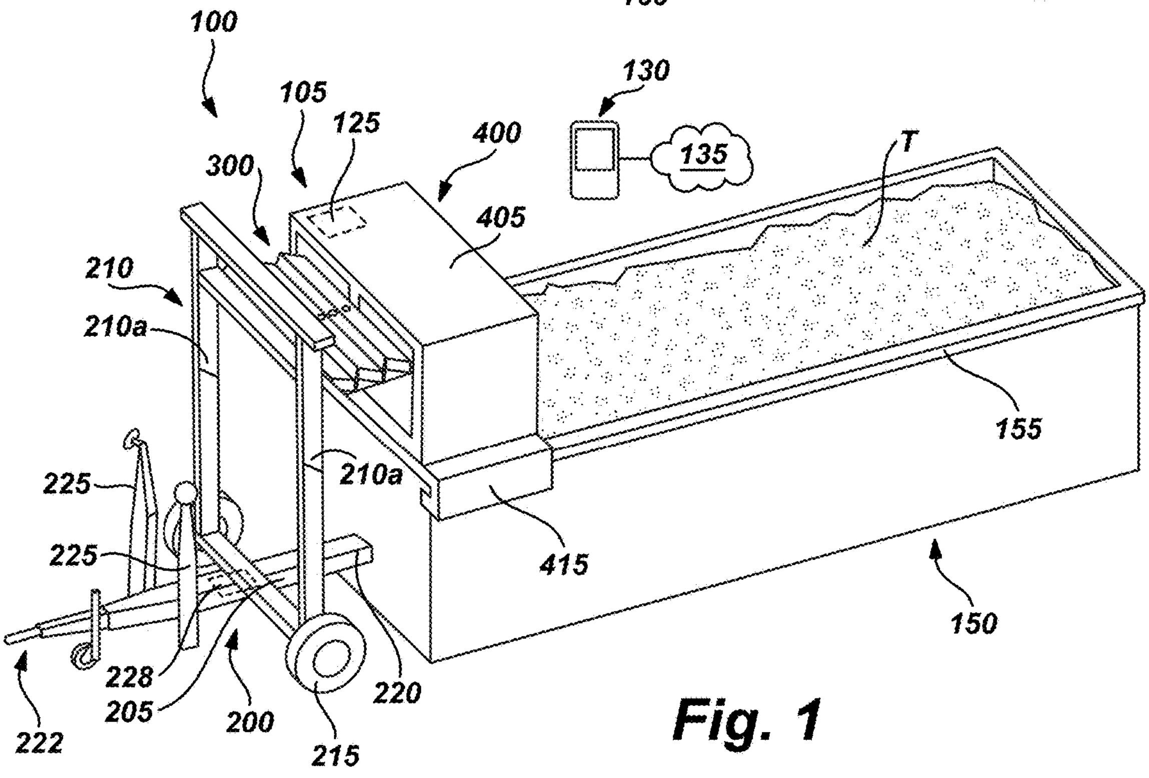
FIG. 1 is a perspective view of an exemplary embodiment of the present invention.

FIG. 1 illustrates an exemplary disclosed system 100 that may include an apparatus 105 that may be an apparatus (e.g., mobile apparatus such as a towable apparatus or a self-propelled apparatus) for on-site compaction. Apparatus 105 may include a structural assembly 200 that may movably support a carriage assembly 400 including a compactor 500. Carriage assembly 400 may be driven by a drive assembly 300 that may be attached between structural assembly 200 and carriage assembly 400. During an operation of apparatus 105, carriage assembly 400 may be movably attached to a receptacle 150 further described below.

Figure 2A:
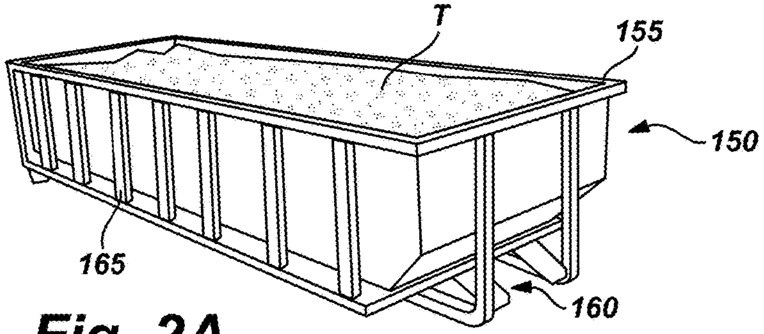
FIG. 2A is a perspective view of another configuration of the exemplary receptacle illustrated in FIG. 2.
Figure 2B:
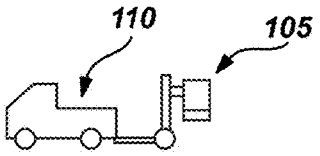
FIG. 2B is a schematic view of an exemplary embodiment of the present invention.
Figure 2:
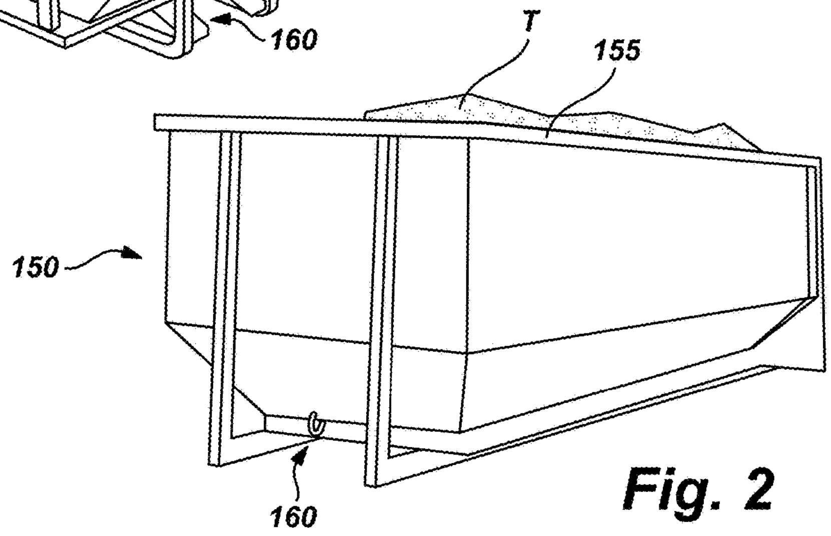
FIG. 2 is a perspective view of an exemplary receptacle for use with the present invention.

As illustrated in FIGS. 1 and 2, receptacle 150 may be any suitable receptacle (e.g., a trash receptacle or container) for containing trash (e.g., trash, refuse, debris, waste, or garbage) such as trash T. Receptacle 150 may be a front-load dumpster, a rear-load dumpster, or a construction dumpster. For example, receptacle 150 may be an elongated dumpster such as a construction and debris dumpster used during construction and renovation projects (e.g., in residential and commercial construction and renovation). Receptacle 150 may be a receptacle having a capacity of between about 2 cubic yards and 40 cubic yards or more. For example, receptacle 150 may be a construction and debris dumpster having a capacity of between about 10 and 40 cubic yards, between about 20 and 30 cubic yards (e.g., about 30 cubic yards). In at least some exemplary embodiments, receptacle 150 may be a construction and debris dumpster having a capacity of about 30 cubic yards (e.g., a 30 yard dumpster) with wall heights of about 6 feet. Receptacle 150 may be formed from any suitable structural material such as metal or structural plastic (e.g., or wood, composite material, and/or any other suitable structural material). For example, receptacle 150 may be formed from structural steel.

Receptacle 150 may include a rail 155 and a connector 160 that may be formed from similar material as receptacle 150 described above. Connector 160 may be a hook that may be used to move (e.g., deliver and remove) receptacle 150 to and from a work site. Rail 155 and connector 160 may be integrally formed with receptacle 150 and/or attached via any suitable technique such as, for example, via mechanical fasteners (e.g., bolts and/or screws), welding, and/or any other suitable attachment technique for attaching structural members. Rail 155 may serve as a guide (e.g., track) and/or anchor for carriage assembly 400 as further described below. Connector 160 may be a winch hook connection (e.g., an eye bar, a hook, and/or any other suitable fastener) that may be used for removably attaching a portion of structural assembly 200 to receptacle 150 when apparatus 105 is removably attached to receptacle 150 for example as described below.

In at least some exemplary embodiments and as illustrated in FIG. 2A, receptacle 150 may include a plurality of ribs 165 (e.g., wall stiffeners) so that walls of receptacle 150 may be corrugated walls. Rib 165 may be formed from similar material as receptacle 150 described above. Rib 165 may be integrally formed with receptacle 150 and/or attached via any suitable technique such as, for example, via mechanical fasteners (e.g., bolts and/or screws), welding, and/or any other suitable attachment technique for attaching structural members.

Structural assembly 200, drive assembly 300, carriage assembly 400, and compactor 500 may be formed from any suitable structural materials for performing the exemplary disclosed method. The exemplary disclosed structural members of structural assembly 200, drive assembly 300, carriage assembly 400, and compactor 500 described below may be formed from metal material such as steel, aluminum, and/or any other suitable structural material. Structural assembly 200, drive assembly 300, carriage assembly 400, and compactor 500 may also include flexible components such as elastomeric material, synthetic or natural rubber, and/or any other suitable flexible material (e.g., located between certain structural members), control components such as electronic and computer control components (e.g., similar to as described herein), and/or any other suitable components for facilitating operation of apparatus 105 for example as described below. Structural members of structural assembly 200, drive assembly 300, carriage assembly 400, and compactor 500 may be integrally formed and/or attached via any suitable technique such as, for example, via mechanical fasteners (e.g., bolts and/or screws), welding, and/or any other suitable attachment technique for attaching structural members. Structural members of structural assembly 200, drive assembly 300, carriage assembly 400, and compactor 500 may include structural metal (e.g., steel or aluminum) shapes such as structural shapes (e.g., beams or angles), and/or any other suitable elongated structural members, plate members, fasteners, and/or any other suitable structural members.

Figure 6:
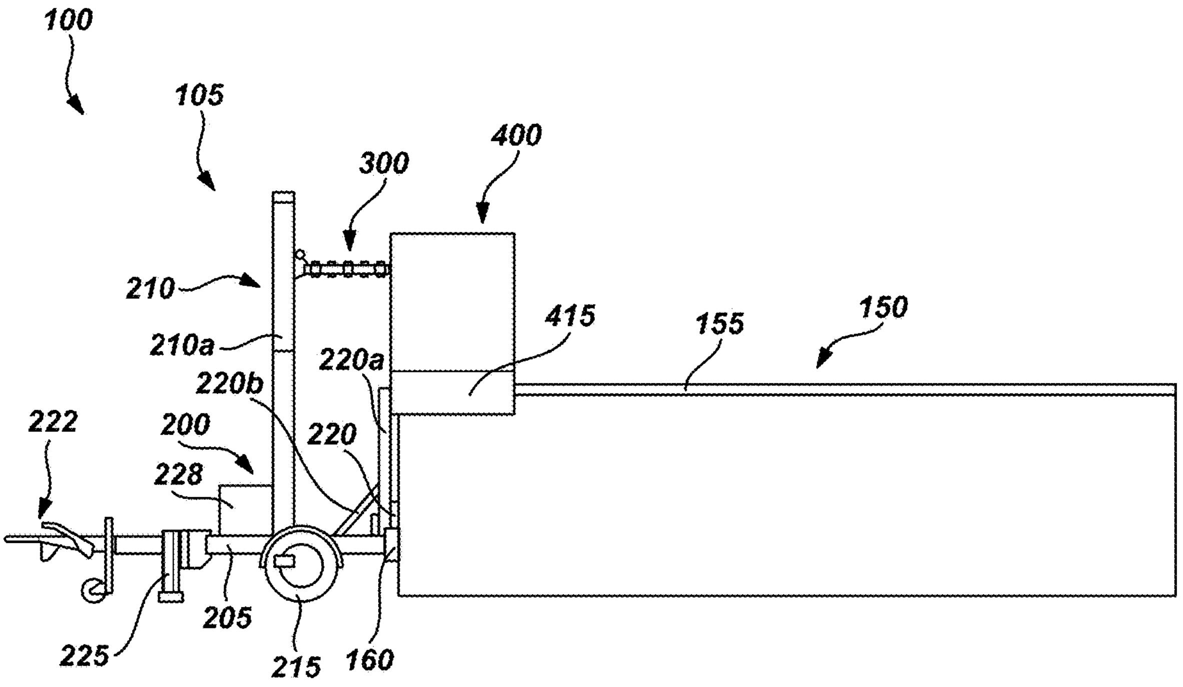
FIG. 6 is a side view of the exemplary embodiment illustrated in FIG. 1.

Structural assembly 200 may include a towable frame 205 and a support frame 210. Towable frame 205 may provide structural support to support frame 210. Towable frame 205 may for example include a plurality of wheels 215 (e.g., movably attached to an axle formed by a structural member of towable frame 205) for supporting apparatus 105 for example as illustrated in FIGS. 1 and 6. Towable frame 205 may also include a fastener 220 that may be removably fastened to connector 160 of receptacle 150 when apparatus 105 (e.g., carriage assembly 400) is removably connected to receptacle 150. Fastener 220 may be any suitable mechanical fastener such as, for example, a winch cable assembly (e.g., that may deploy a winch cable and fastener that may be fastened to connector 160), a bolt, a latch, a coupler, and/or any other suitable mechanical fastener. For example, fastener 220 may include a winch assembly that may be removably attached to connector 160 that may be a hook. Also for example and as illustrated in FIG. 6, a support plate 220*a* stabilized by a support strut 220*b* may be disposed (e.g., attached) on towable frame 205 at or near a location of fastener 220. Support plate 220*a* may engage (e.g., contact and abut) receptacle 150 (e.g., ribs of receptacle 150) when fastener 220 that may be a winch draws apparatus 105 to receptacle 150 (e.g., and fastener 220 of apparatus 105 is locked to connector 160 of receptacle 150). Towable frame 205 may also include a tow connector 222 that may be generally similar to as described above regarding fastener 220 and/or connector 160 and may be used to removably attach towable frame 205 (e.g., apparatus 105) to a vehicle 110 (e.g., a truck, construction vehicle, car, or other suitable vehicle) as illustrated in FIG. 2B so that apparatus 105 may be towed between locations (e.g., towed to the on-site location of receptacle 150).

Figure 4:
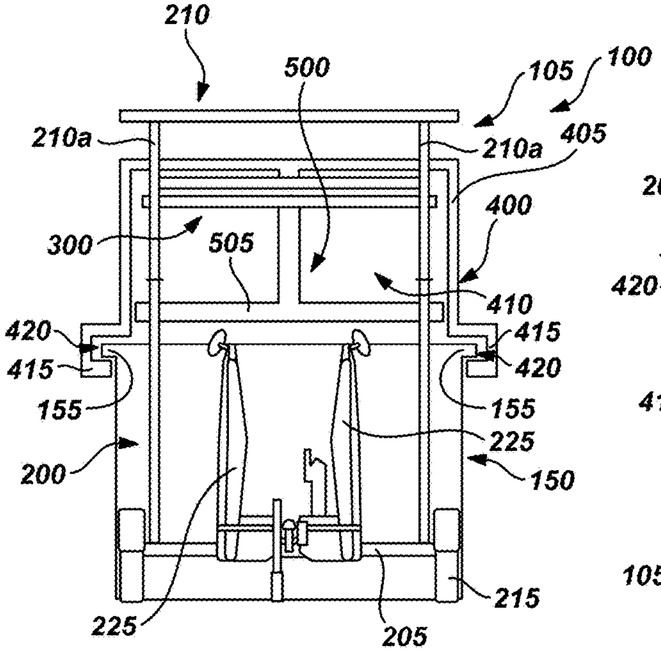
FIG. 4 is a front view of the exemplary embodiment illustrated in FIG. 1.

Towable frame 205 may also include a plurality of outrigger members 225. Outrigger members 225 may be structural members that may be movable relative to towable frame 205. For example, outrigger members 225 may be rotatable relative to towable frame 205 between a raised position (e.g., as illustrated in FIGS. 1 and 4) and a deployed position (e.g., as illustrated in FIG. 6). For example, outrigger members 225 may be actuated between the raised position and the deployed position via one or more power components disposed on (e.g., attached to or supported by) towable frame 205 and/or at other suitable locations of apparatus 105. For example, the exemplary disclosed power component may be a power plant 228 disposed at (e.g., supported at and/or attached to) towable frame 205. The exemplary disclosed power component may be any suitable component for actuating outrigger members 225 (e.g., and/or other exemplary disclosed components described herein)

such as, for example, a motor or engine. The exemplary disclosed power component may include a hydraulic pump (e.g., or a pneumatic pump) driven by the motor or engine. The exemplary disclosed power component may include any suitable electric motor. The exemplary disclosed power component may include a servo motor, a stepper motor, a brushless motor, and/or any other suitable type of motor. The exemplary disclosed power component may include a reversible electric motor (e.g., a reversible electric motor) and/or one or more unidirectional motors (e.g., one-way motors). The exemplary disclosed power component may also include any suitable power source for powering an operation of the exemplary disclosed power component. For example, the exemplary disclosed power component may include a battery, an electrical connector (e.g., to connect to an external power source), a renewable energy component such as a solar power connector (e.g., solar panels), and/or any other suitable power source. For example, the exemplary disclosed power component may be an electric power source (e.g., a motor), an engine (e.g., an internal combustion engine), or any other suitable power source and may be included in a power drive assembly. Also for example, the exemplary disclosed power component may be connected to an external power source that may feed power to a power drive assembly of the exemplary disclosed power component. One or more exemplary disclosed power components may be disposed at (e.g., integrated into) structural assembly 200 and/or drive assembly 300, and may drive an operation of components of outrigger members 225 and/or drive assembly 300 for example as described herein. When in the deployed position for example as illustrated in FIG. 6, outrigger members 225 may contact (e.g., abut) the ground and thereby help to stabilize apparatus 105 when performing the exemplary disclosed compaction operation.

Support frame 210 may be attached to towable frame 205 via any suitable technique, for example by any of the exemplary disclosed structural attachment techniques described herein. For example, support frame 210 and towable frame 205 may together form a substantially rigid structural frame (e.g., or a selectively movable frame in which support frame 210 may be selectively moved or rotated relative to towable frame 205 to facilitate towing for example as described below) for supporting drive assembly 300, carriage assembly 400, and compactor 500. Also for example, drive assembly 300 may be structurally attached to support frame 210 via any suitable technique, for example by any of the exemplary disclosed structural attachment techniques described herein. Support frame 210 may also include extendable and contracting vertical members (e.g., telescoping members) that may allow for an adjustment of a height of support frame 210 (e.g., and a height of drive assembly 300 and carriage assembly 400). For example, extension and contraction of vertical members (e.g., adjustable members 210*a* such as telescoping members) of support frame 210 may be extended and contracted to a desired height (e.g., based on a height of receptacle 150 for example as described below). Adjustable members 210*a* may be locked in place at the desired height via any suitable technique such as, for example, via mechanical fasteners (e.g., selectively lockable and unlockable mechanical fasteners such as pins or bolts selectively received in corresponding aligning apertures of adjustable members 210*a* such as telescoping members 210*a*).

Drive assembly 300 may be structurally attached between support frame 210 and carriage assembly 400 via any suitable technique such as, for example, by any of the exemplary disclosed structural attachment techniques described herein. Drive assembly 300 may include any suitable mechanical assembly for moving (e.g., driving a movement of) carriage assembly 400 on receptacle 150 (e.g., when carriage assembly 400 is movably attached to receptacle 150 for example as described below) such as, for example, a scissoring assembly, a telescoping assembly, and/or any other suitable assembly for being driven by the exemplary disclosed one or more power components described above to expand and contract to thereby drive a movement of carriage assembly 400. For example, drive assembly 300 may include a scissoring assembly or a telescoping assembly that may be driven (e.g., hydraulically, pneumatically, or electro-mechanically driven) via the exemplary disclosed one or more power components disposed at (e.g., integrated into) structural assembly 200 and/or drive assembly 300 (e.g., and/or carriage assembly 400 and/or compactor 500). In at least some exemplary embodiments, drive assembly 300 may include a hydraulically driven scissoring assembly that expands and contracts between structural assembly 200 and carriage assembly 400, thereby moving carriage assembly 400 relative to structural assembly 200 along receptacle 150. Structural attachment of drive assembly 300 between structural assembly 200 and carriage assembly 400 may include movable fasteners (e.g., rotatable fasteners such as hinges) to facilitate expansion and contraction of drive assembly 300.

Figure 7:
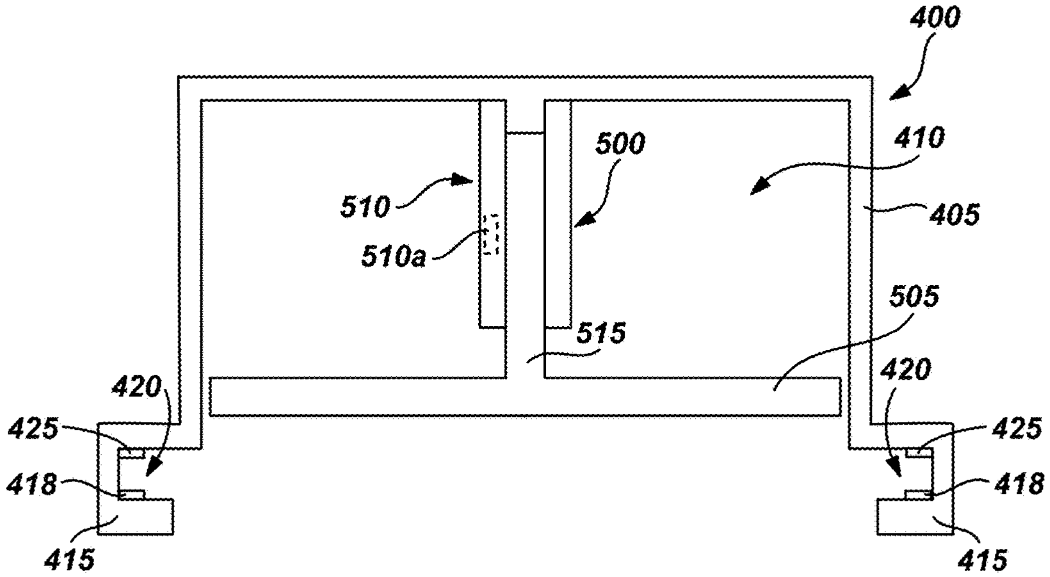
FIG. 7 is a detailed view of an exemplary component of the present invention.

Carriage assembly 400 may be structurally attached to drive assembly 300 for example as described above. For example as illustrated in FIG. 7, carriage assembly 400 may include a housing 405 that may be structurally attached to drive assembly 300 for example as described above. Housing 405 may be configured to receive and house compactor 500. For example, housing 405 may be configured to form a compactor cavity 410 for receiving, housing, and supporting compactor 500. Housing 405 may also be configured to form one or more flanges 415 (e.g., at both sides of housing 405) for receiving and removably attaching to rails 155 of receptacle 150. For example, flange 415 may form a flange recess 420 for receiving rail 155 at each side of housing 405 (e.g., to receive rail 155 disposed at each side of receptacle 150). Flanges 415 may be integrally formed with housing 405 or attached to housing 405 via any suitable technique such as the exemplary disclosed structural attachment techniques described herein.

Figure 5:
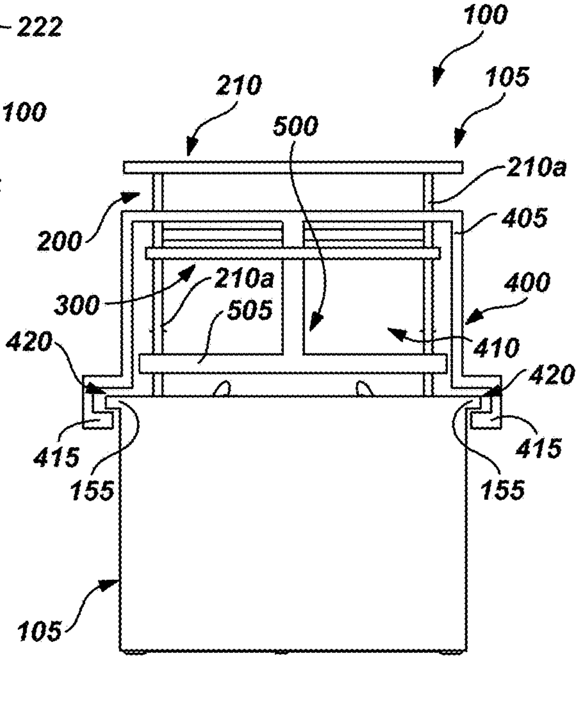
FIG. 5 is a rear view of the exemplary embodiment illustrated in FIG. 1.

Flange 415 may be opened at the ends (e.g., have open ends) so that rail 155 may be received at an end portion of flange 415. For example, flanges 415 may be moved (e.g., slid) onto rails 155 so that rails 155 pass through the open ends of flanges 415 and are received in flange recesses 420 of flanges 415 for example as illustrated in FIGS. 4, 5, and 6. One or more rollers 425 (e.g., rotatable roller supports) may be disposed in flange recess 420 to facilitate horizontal movement of flanges 415 (e.g., carriage assembly 400) relative to rails 155 for example as illustrated in FIG. 7. For example, rail 155 may contact rotatable rollers 425 to facilitate horizontal movement of rails 155 relative to flanges 415 (e.g., as housing 405 of carriage assembly 400 moves horizontally along receptacle 150). For example, rotatable rollers 425 may abut a top surface of rails 155 so that carriage assembly 400 may move (e.g., roll) on rails 155.

Figure 3:
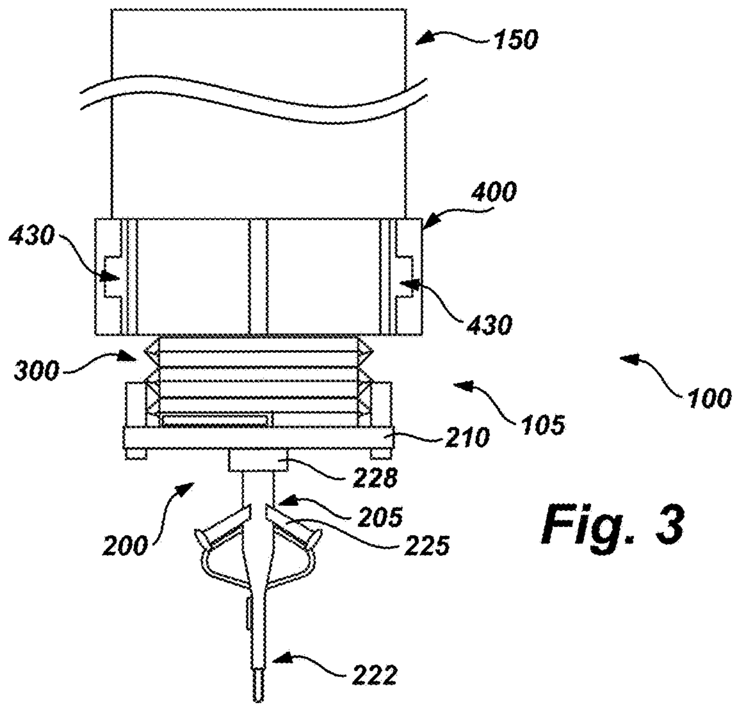
FIG. 3 is a plan view of the exemplary embodiment illustrated in FIG. 1.

Housing 405 (e.g., flanges 415) may also include rib recesses 430 for example as illustrated in FIG. 3. Rib recesses 430 may be configured to receive respective ribs 165 of receptacle 150 (e.g., when receptacle 150 is configured for example as illustrated in FIG. 2A). In at least some exemplary embodiments, rib recesses 430 may include sloped surfaces configured to facilitate horizontal movement of housing 405 (e.g., flanges 415) relative to ribs 165 of receptacle 150 as carriage assembly 400 moves horizontally along rails 155. Also in at least some exemplary embodiments, flanges 415 may include clamps 418 disposed in flange recesses 420 as illustrated in FIG. 7. Clamp 418 may be a mechanical fastener having one or more movable elements that may be actuated by the exemplary disclosed one or more power components described above (e.g., the one or more movable elements may be hydraulically, pneumatically, and/or electrically powered and actuated). Clamps 418 may be configured to clamp horizontally (e.g., move inward toward a side wall and/or rails 155 of receptacle 150 to an engaged position, and outward away from the side wall and/or rails 155 of receptacle 150 to a disengaged position) to allow substantially free movement of housing 405 relative to receptacle 150 and/or between locations of ribs 165 (e.g., when receptacle 150 includes ribs 165 for example as illustrated in FIG. 2A), and then to be clamped (e.g., locked) in place against the side wall of receptacle 150 (e.g., over ribs 165 in at least some exemplary embodiments) to provide additional support prior to and during compaction. For example, before compactor 500 operates as described below, clamps 418 may clamp to receptacle 150 (e.g., move to an engaged position) by moving toward the respective side walls and/or rails 155 of receptacle 150 to provide additional support to apparatus 105 during the exemplary disclosed compaction operation. Clamps 418 may then move outward to the disengaged position prior to and during movement of carriage assembly 400 via drive assembly 300.

Compactor 500 may be received, housed, and supported in compactor cavity 410 of carriage assembly 400 for example as illustrated in FIG. 7. Compactor 500 may include a compaction plate 505 that may be operably connected to a compaction driver 510 via a compaction rod 515. Compaction driver 510 may be for example a pneumatic, hydraulic, or electro-mechanical compaction driver (e.g., including a compaction cylinder). Compaction driver 510 may be powered and/or include one or more exemplary disclosed power components described above. One or more exemplary disclosed power components (e.g., power plant 228) may be disposed at (e.g., integrated into) structural assembly 200, drive assembly 300, carriage assembly 400, and/or compactor 500, and may be used to drive compaction driver 510 (e.g., as well as outrigger members 225 and/or drive assembly 300). Compaction driver 510 may drive compaction movement of compaction plate 505 via compaction rod 515. For example, compaction rod 515 may be actuated via operation of compaction driver 510, thereby driving compaction plate 505 in a desired direction (e.g., downward) to compact trash T for example as described herein. Compaction plate 505 may be any suitable size configured to be received in compactor cavity 410 such as, for example, between about 3 feet and about 5.5 feet, or between about 3.5 feet and about 5.25 feet in length (e.g., in a longitudinal direction of receptacle 150 in a direction of movement of carriage assembly 400 and compactor 500), and between about 6 feet and about 8 feet in width (e.g., or any other suitable width corresponding to a width of receptacle 150 and/or compactor cavity 410). Compaction driver 510 may include a sensor **510*a* that may sense a force transferred from compaction driver 510 to compaction plate 505 via compaction rod 515, which may be used by the exemplary disclosed controller to determine (e.g., calculate) a pressure exerted by compactor 500 (e.g., compaction plate 505) on trash T. Sensor 510*a* may be a piezoelectric, piezoresistive, capacitive, or any other suitable type of pressure sensor for sensing a force based on which a pressure (e.g., a pressure based on dimensions of compaction plate 505) exerted on trash T may be determined by the exemplary disclosed controller. For example, sensor 510*a*** may communicate with the exemplary disclosed controller via the exemplary disclosed communication techniques described below.

Returning to FIG. 1, system 100 may include a controller 125 for controlling the exemplary disclosed component operations of apparatus 105. Controller 125 may be any suitable computing device for controlling an operation of apparatus 105. For example, controller 125 may include a processor (e.g., micro-processing logic control device) or board components. Controller 125 may control apparatus 105 based on input data and/or commands (e.g., control commands) received directly from a user device 130 or from user device 130 via a network 135. Controller 125 may also control apparatus 105 based on any suitable algorithms for controlling on-site compaction of receptacles 150. Controller 125 may be located at any suitable location of apparatus 105 or any other suitable location.

User device 130 may be any suitable device for interfacing with controller 125 and/or any other suitable components of system 100. User device 130 may be any suitable user interface for receiving input and/or providing output (e.g., image data) to a user of system 100. User device 130 may be, for example, a touchscreen device (e.g., of a smartphone, a tablet, a smartboard, and/or any suitable computer device), a wearable device, a computer keyboard and monitor (e.g., desktop or laptop), an audio-based device for entering input and/or receiving output via sound, a tactile-based device for entering input and receiving output based on touch or feel, a dedicated user interface designed to work specifically with other components of system 100, and/or any other suitable user interface. For example, user device 130 may include a touchscreen device of a smartphone or handheld tablet. For example, user device 130 may include a display (e.g., a computing device display, a touchscreen display, and/or any other suitable type of display) that may provide output, image data, and/or any other desired output or input prompt to a user. For example, the exemplary disclosed display may include a graphical user interface to facilitate entry of input by a user and/or receiving output such as image data. Any suitable application and/or web browser may be installed on user device 130 and utilized by a user of system 100 to control apparatus 105.

Network 135 may be any suitable communication network over which data may be transferred between controller 125, user device 130, and/or any other suitable components of system 100. Network 135 may be the internet, a LAN (e.g., via Ethernet LAN), a WAN, a WiFi network, or any other suitable network. The components of system 100 may also be directly connected (e.g., by wire, cable, USB connection, and/or any other suitable electro-mechanical connection) to each other and/or connected via network 135. For example, components of system 100 may wirelessly transmit data by any suitable technique such as, e.g., wirelessly transmitting data via 4G LTE networks (e.g., or 5G networks) or any other suitable data transmission technique for example via network communication. Also for example, controller 125, user device 130, and/or any other suitable components of system 100 may communicate via WiFi, Bluetooth, ZigBee, NFC, IrDA, and/or any other suitable short distance technique.

System 100 (e.g., controller 125 and/or user device 130) may include one or modules for performing the exemplary disclosed operations of the exemplary disclosed method.

The one or more modules may be stored and operated by any suitable components of system 100 (e.g., including processor components) such as, for example, controller 125, user device 130, and/or any other suitable component of system 100. For example, system 100 may include one or more modules having computer-executable code stored in non-volatile memory. System 100 may also include one or more storages (e.g., buffer storages). The exemplary disclosed buffer storage may be implemented in software and/or a fixed memory location in hardware of system 100. The exemplary disclosed buffer storage (e.g., a data buffer) may store data temporarily during an operation of system 100.

The exemplary disclosed system, apparatus, and method may be used in any suitable application for trash compaction. The exemplary disclosed system, apparatus, and method may be used in any suitable application for on-site trash compaction. For example, the exemplary disclosed system, apparatus, and method may be used in any suitable application for compaction of trash in an on-site receptacle such as an on-site construction and debris dumpster used in residential and commercial construction and renovation.

Figure 9:
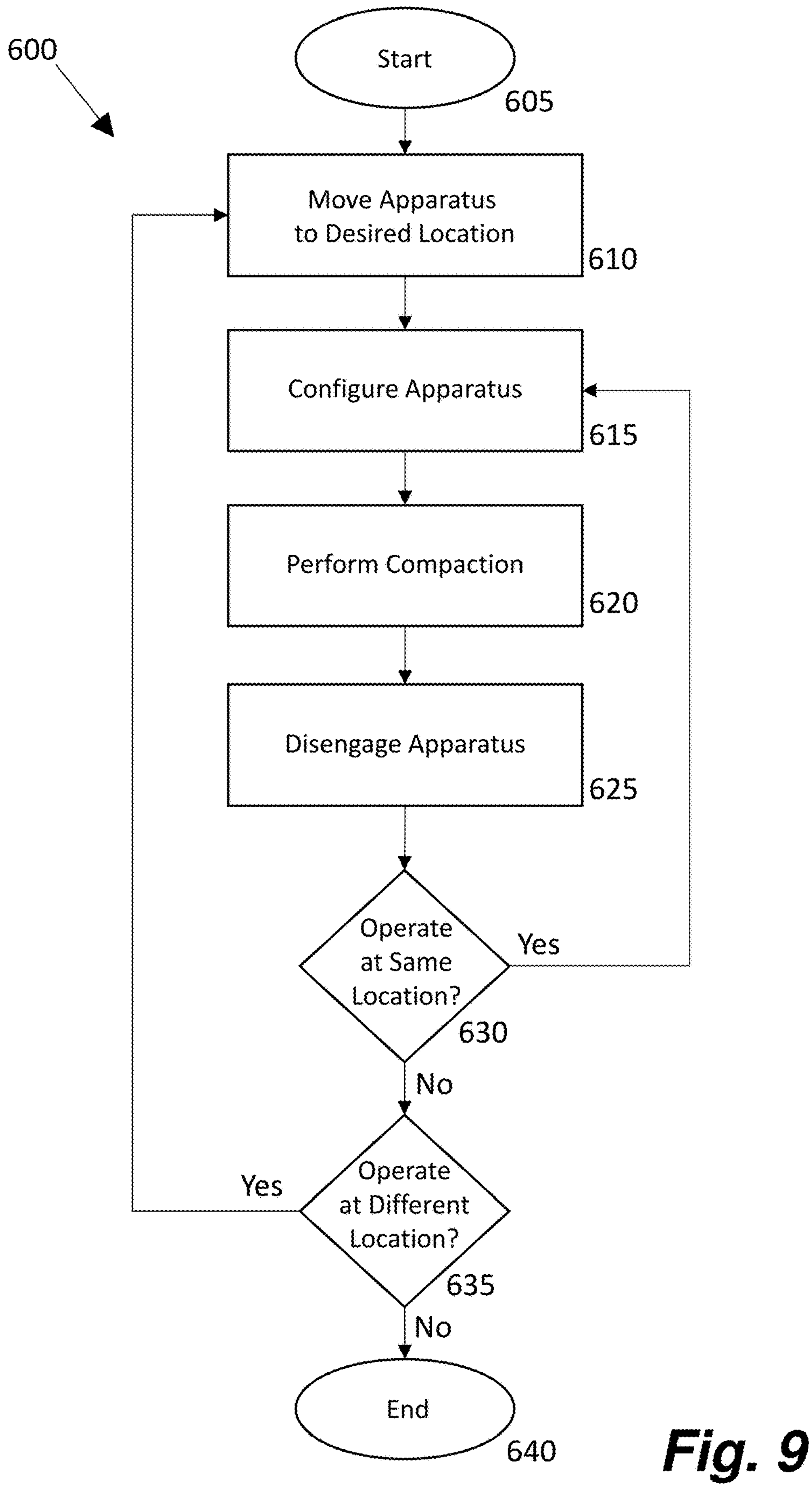
FIG. 9 illustrates an exemplary process of using at least some exemplary embodiments of the present disclosure.

FIG. 9 illustrates an exemplary process of using the exemplary disclosed system and apparatus. Process 600 begins at step 605. At step 610, apparatus 105 may be moved to a desired location. For example, apparatus 105 may be towed to a desired geographic location (e.g., desired work site such as a residential or commercial construction or renovation work site) via vehicle 110. During movement (e.g., towing) of apparatus 105, outrigger members 225 may be disposed in the exemplary disclosed raised position. In at least some exemplary embodiments, wheels 215 of apparatus 105 may be powered by the exemplary disclosed power component so that apparatus 105 may move self-propelled (e.g., without vehicle 110) to the desired location.

At step 615, apparatus 105 may be configured at the desired work site. Apparatus 105 may be positioned at a receptacle 150 containing trash T to be compacted. Apparatus 105 may be positioned so that rail 155 of receptacle 150 may be aligned and received in flange recesses 420 of flanges 415 for example as illustrated in FIGS. 4, 5, and 6. For example, a height of support frame 210 may be adjusted based on adjusting adjustable members 210*a* to a desired position (e.g., setting a height of support frame 210) for example as described above, with adjustable members 210*a* being extended or contracted, and for example locked in place, to set the desired height of support frame 210 (e.g., so that flange recesses 420 of flanges 415 are substantially aligned with rails 155) for example as described herein. Flanges 415 may receive rails 155 at the exemplary disclosed open end portions of flanges 415, and then apparatus 105 may be moved toward receptacle 150 (e.g., via vehicle 110 or via manual rolling or self-propelled movement of apparatus 105). Drive assembly 300 may then be operated to drive (e.g., move) carriage assembly 400 relative to receptacle 150. Drive assembly 300 (e.g., and adjustment of adjustable members 210*a*) may be operated via control of controller 125 by a user via user device 130 (e.g., via the exemplary disclosed direct communication or communication via network 135) or via a user interface of apparatus 105 that may include interface controls similar to user device 130. Drive assembly 300 may drive (e.g., move) carriage assembly 400 along a length of receptacle 150 (e.g., substantially horizontally or in an elevated or declined trajectory relative to the ground and/or based on terrain of the work site) so that flanges 415 are slid along rails 155 to a desired initial compaction position for example as illustrated in FIGS. 1, 3, 6, and 8A. As flanges 415 are slid over and/or on rails 155, rotatable rollers 425 may contact rails 155 to facilitate movement of flanges 415 of housing 405 relative to rails 155 (e.g., as housing 405 moves along receptacle 150).

Figure 8A:
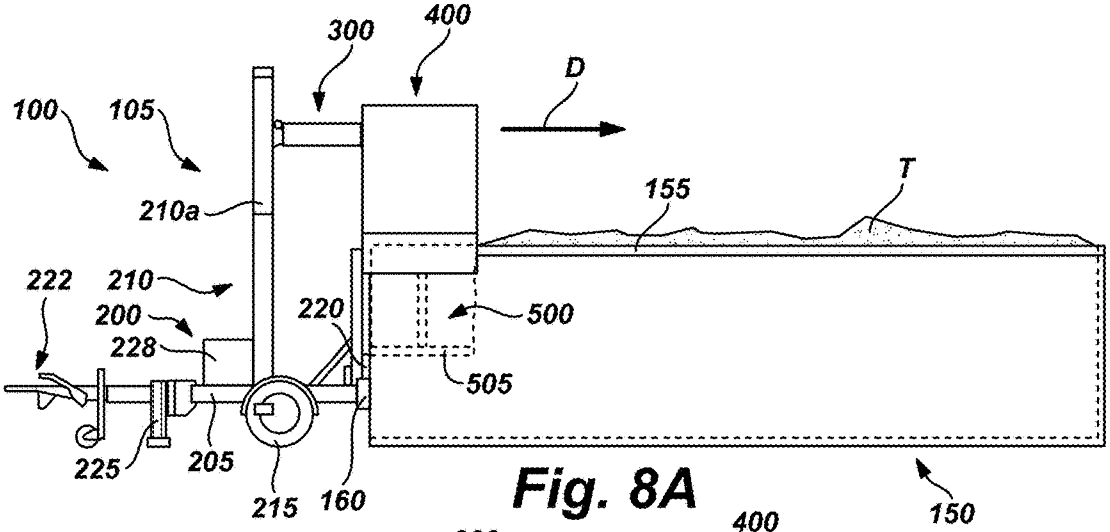
FIGS. 8A, 8B, and 8C are side views illustrating an exemplary use of an exemplary embodiment of the present invention.

In at least some exemplary embodiments in the exemplary disclosed initial compaction position illustrated for example in FIGS. 1, 6, and 8A, fastener 220 of towable frame 205 may be attached (e.g., removably attached) to connector 160 of receptacle 150. Outrigger members 225 may be moved from the exemplary disclosed raised position of FIG. 1 to the exemplary disclosed deployed position of FIG. 6 to provide further stability to apparatus 105. Outrigger members 225 may be operated to move via control of controller 125 by the user via user device 130 (e.g., via the exemplary disclosed direct communication or communication via network 135) or via the exemplary disclosed user interface of apparatus 105 that may include interface controls similar to user device 130.

Returning to FIG. 9 at step 620, system 100 may operate to perform compaction using apparatus 105. Compaction may begin at the exemplary disclosed initial compaction position for example as illustrated in FIGS. 1, 3, 6, and 8A. Compactor 500 may be operated to perform compaction at the exemplary disclosed initial compaction position. Compactor 500 may be operated via control of controller 125 by a user via user device 130 (e.g., via the exemplary disclosed direct communication or communication via network 135) or via a user interface of apparatus 105 that may include interface controls similar to user device 130. Compaction driver 510 may drive compaction movement of compaction plate 505 via compaction rod 515. For example, compaction rod 515 may be actuated via operation of compaction driver 510, thereby driving compaction plate 505 downward to compact trash T at the initial compaction position for example as illustrated in FIG. 8A. One or more iterations of compaction via compactor 500 may be performed at the initial compaction position so that trash T is compacted a desired amount (e.g., to a desired pressure as described herein).

Drive assembly 300 may then be operated to drive (e.g., move) carriage assembly 400 in a carriage direction D relative to receptacle 150. Drive assembly 300 may be operated via control of controller 125 by a user via user device 130 (e.g., via the exemplary disclosed direct communication or communication via network 135) or via a user interface of apparatus 105 that may include interface controls similar to user device 130. Drive assembly 300 may drive (e.g., move) carriage assembly 400 any desired interval in carriage direction D such as, for example, between up to about 1 foot and 3 feet or more, between about 1.5 feet and about 2.5 feet, or about 2 feet (e.g., or any other desired distance). Clamps 418 may be moved outward to the exemplary disclosed disengaged position when drive assembly 300 is driving (e.g., moving) carriage assembly 400. When carriage assembly 400 is moved to a next compaction position, clamps 418 may be moved inward (e.g., controlled by controller 125) to the exemplary disclosed engaged position against side walls and/or rails 155 of receptacle 150 to provide further support. Compactor 500 may then be operated to again perform compaction at this second position. One or more iterations of compaction via compactor 500 may be performed at this second position so that trash T is compacted a desired amount.

Figure 8B:
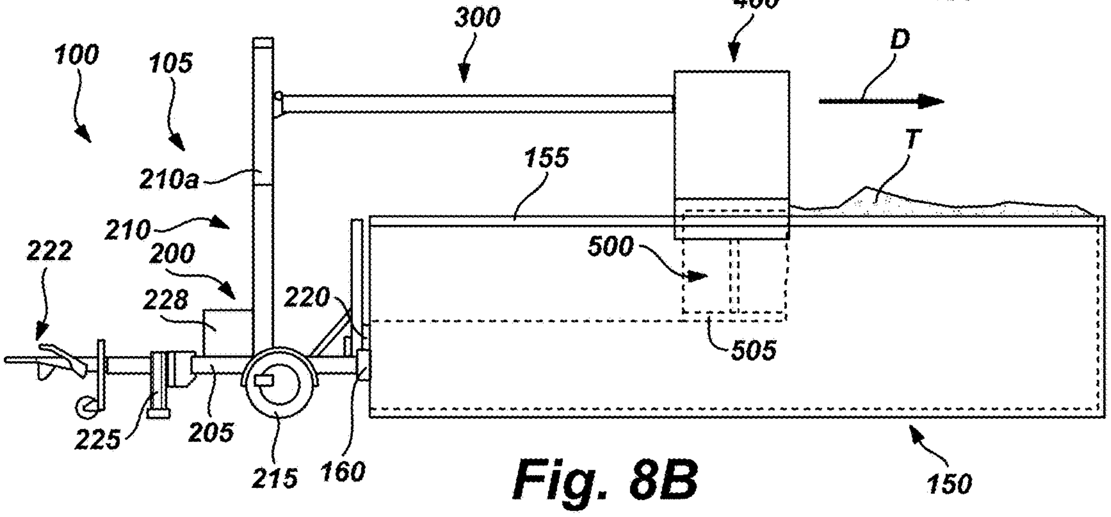
Figure 8C:
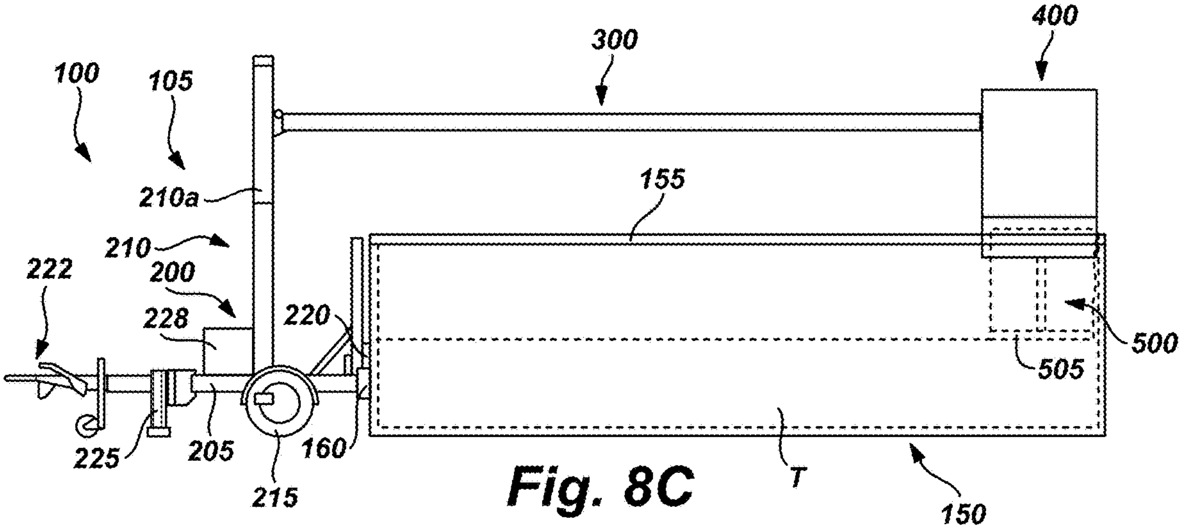

Drive assembly 300 may then move carriage assembly 400 by the exemplary disclosed interval, at which compactor 500 may be operated to perform compaction as described above. Compaction may be performed at each compaction location (e.g., interval) until a predetermined pressure is reached (e.g., based on the force exerted by compaction driver 510 that may be sensed by sensor 510*a*), which may correspond to a desired compaction amount of trash T. For example, compaction may be performed until a pressure of between about 10 psi and about 25 psi (e.g., or any other desired pressure) is determined to be exerted on trash T based on the force exerted by compaction driver 510 and sensed by sensor 510*a*. Apparatus 105 may thereby perform a series of compactions of trash T at the exemplary disclosed intervals along a length of receptacle 150. For example, FIG. 8B illustrates compaction at an exemplary intermediate compaction position at an intermediate interval performed by apparatus 105. Intervals may remain substantially the same or may vary between iterations of the exemplary disclosed driving of carriage assembly 400 via drive assembly 300 and compaction of trash T by compactor 500. As an illustrative example when receptacle 150 is 22 feet long, 11 compactions by compactor 500 spaced at 2 feet intervals in carriage direction D may be performed. As another illustrative example when receptacle 150 is 30 feet long, 12 compactions by compactor 500 spaced at 2.5 feet intervals in carriage direction D may be performed. As another illustrative example, compactions at varying and/or overlapping intervals may be performed. The exemplary disclosed iterative operation of drive assembly 300 and compactor 500 may be controlled by the user as described above and/or may be automatically controlled by controller 125 (e.g., based on input entered via user device 130 including information of a length of receptacle 150 and a number of compactions to be performed at each location). For example if trash T is expected to be difficult to compact, additional compactions may be performed at each interval. Compaction may be ended after compaction is performed at a final compaction position for example as illustrated in FIG. 8C (e.g., at a distal end of receptacle 150 relative to a location of apparatus 105). In at least some exemplary embodiments, compaction may be performed (e.g., or repeated) in a reverse direction of carriage direction D in intervals moving from the exemplary disclosed final compaction position illustrated in FIG. 8C and toward the exemplary disclosed initial compaction position illustrated in FIG. 8A. When compaction at step 620 of trash T in a given receptacle 150 is substantially complete, additional trash T may be added to the given receptacle 150. Step 620 of the given receptacle 150 may be then repeated as desired to increase an amount of trash T that may be deposited in the given receptacle 150. Apparatus 105 may be moved from the given receptacle 150 to perform compaction at other receptacles 150 while additional trash T is added to the given receptacle 150, or apparatus 105 may remain at the given receptacle 150 as additional trash T is added to the given receptacle 150. For example, apparatus 105 may be used to compact trash T in a plurality of receptacles 150 at a given work site or at a single receptacle 150 at the given work site.

When receptacle 150 is configured to have ribs 165 for example as illustrated in FIG. 2A, rib recesses 430 that may include sloped surfaces may facilitate horizontal movement of housing 405 (e.g., flanges 415) relative to receptacle 150 as carriage assembly 400 moves along rails 155. Also for example, clamps 418 may move horizontally (e.g., outward) to allow substantially free movement of housing 405 between locations of ribs 165 as described above. In at least some exemplary embodiments, the exemplary disclosed module may provide a control option in which receptacle 150 includes ribs 165 and clamps 418 are controlled as described above (e.g., as well as a control option for when receptacle 150 does not include ribs 165).

At step 625, apparatus 105 may be disengaged from receptacle 150 by performing substantially the reverse steps described at step 615. At step 630, a user may determine whether apparatus 105 is to continue to operate at a same given work site to perform additional compaction. If additional compaction is to be performed at the given work site, process 600 returns to step 615. As many iterations as desired of steps 615 through 630 may be performed on as many receptacles 150 as desired at the given work site for example as described above. If additional compaction is not to be performed at the same given work site, process 600 proceeds to step 635.

At step 635, a user may determine whether compaction is to be performed at a different location (e.g., work site). If compaction is to be performed at another work site, process 600 returns to step 610 and apparatus 105 may be moved (e.g., towed) to a different work site. As many iterations as desired of steps 610 through 635 may be performed at as many work sites as desired for example as described above. If compaction is not to be performed at another work site, then process 600 ends at step 640.

In at least some exemplary embodiments, apparatus 105 may achieve up to about 40% more efficient use of receptacle 150 via the exemplary disclosed operation (e.g., compaction). Apparatus 105 may be a towable machine that may be towed by a vehicle such as vehicle 110. Apparatus 105 may attach to receptacle 150 using fastener 220 (e.g., a winch cable) attached to connector 160. In at least some exemplary embodiments, support frame 210 may be moved (e.g., rotated) relative to towable frame 205 between the position illustrated in FIGS. 1 and 6 to a towed position that may be angled or substantially horizontal to the ground to facilitate towing. Rails 155 of receptacle 150 may be side top rails that may be used as anchoring points for apparatus 105 (e.g., carriage assembly 400). Compaction may be performed until a predetermined pressure is exerted on trash T contained in receptacle 150 as sensed by sensor 510*a* at a given compaction location (e.g., interval). When the desired pressure (e.g., predetermined pressure) is achieved (e.g., and/or any other desired criteria is met such as time of compaction), compaction at this location of trash T may be complete, compaction plate 505 may retract and the flanges 415 may move to an expanded position (e.g., via operation of clamps 418), and carriage assembly 400 may be moved (e.g., by the exemplary disclosed interval) to a next location for compaction. A series of compactions may be performed by repeating this process (e.g., up to 10 compactions for a 22 ft dumpster or any other suitable number of compactions as described herein). The operation of compactor 500 may be controlled by a remote operator to control the process (e.g., via user device 130 controlling controller 125 and/or as described above), with the user for example maintaining visual observation of the compaction series in the exemplary disclosed process (e.g., or by automatic control via controller 125 based on input for example as described above). Carriage assembly 400 supporting compactor 500 may travel from a front to a rear of receptacle 150 based on being driven by drive assembly 300.

In at least some exemplary embodiments, the exemplary disclosed apparatus may be a mobile apparatus for compacting trash in a receptacle. The mobile apparatus may include a drive assembly (e.g., drive assembly 300) attached between a structural assembly (e.g., structural assembly 200) and a carriage assembly (e.g., carriage assembly 400), and a compactor (e.g., compactor 500) supported at the carriage assembly. The carriage assembly may be configured to be removably attached to the receptacle. The drive assembly may be configured to move the carriage assembly to a plurality of positions along a length of the receptacle (e.g., as illustrated in FIGS. 8A, 8B, and 8C and as described above). The compactor may be configured to compact the trash in the receptacle at the plurality of positions. The carriage assembly may include a flange configured to receive a rail of the receptacle. The compactor may be configured to actuate vertically to compact the trash in the receptacle in a direction that may be perpendicular to a carriage direction in which the carriage assembly is configured to move along the length of the receptacle. The carriage assembly may include a flange that forms a flange recess at which a clamp is attached, the clamp configured to selectively clamp to the receptacle at each of the plurality of positions. The carriage assembly may include a flange that forms a flange recess at which a roller is attached, the roller configured to movably support the carriage assembly on a rail of the receptacle. The drive assembly may be configured to move the carriage assembly to the plurality of positions along the length of the receptacle while the carriage assembly is removably attached to the receptacle. The structural assembly may be a vehicle trailer including a plurality of wheels. The compactor may be received in a compactor cavity of the carriage assembly, the compactor including a compaction plate that may be operably connected to a compaction driver via a compaction rod. The structural assembly may include a plurality of movable outriggers configured to move from a raised position to a deployed position contacting the ground supporting the structural assembly when the carriage assembly is removably attached to the receptacle. The structural assembly may include a fastener configured to be attached to a connector of the receptacle when the carriage assembly is removably attached to the receptacle. The drive assembly may be a scissoring assembly or a telescoping assembly.

In at least some exemplary embodiments, the exemplary disclosed method may be a method for compacting trash in a receptacle using a mobile apparatus. The method may include transporting the mobile apparatus to a geographic location of the receptacle, removably attaching a carriage assembly (e.g., carriage assembly 400) of the mobile apparatus to the receptacle, moving the carriage assembly to a plurality of positions along a length of the receptacle (e.g., as illustrated in FIGS. 8A, 8B, and 8C and as described above) while the carriage assembly is removably attached to the receptacle, and compacting the trash in the receptacle at the plurality of positions using a compactor (e.g., compactor 500) supported at the carriage assembly. The method may also include stabilizing the mobile apparatus when the carriage assembly is disposed at each of the plurality of positions by clamping a flange of the carriage assembly to the receptacle. The method may further include stabilizing the mobile apparatus when the carriage assembly is removably attached to the receptacle based on moving at least one movable outrigger from a raised position to a deployed position contacting the ground supporting the mobile apparatus. The method may also include rolling the carriage assembly on the receptacle using a plurality of rollers attached to the carriage assembly as the carriage assembly moves along the length of the receptacle. Compacting the trash in the receptacle at the plurality of positions using the compactor may include actuating the compactor vertically in a direction that is perpendicular to a carriage direction in which the carriage assembly moves along the length of the receptacle. Transporting the mobile apparatus to the geographic location of the receptacle may include towing the mobile apparatus using a vehicle. Moving the carriage assembly along the length of the receptacle while the carriage assembly is removably attached to the receptacle may include scissoring or telescoping an assembly disposed between a structural assembly of the mobile apparatus and the carriage assembly.

In at least some exemplary embodiments, the exemplary disclosed apparatus may be a towable apparatus for compacting trash in an elongated dumpster. The exemplary disclosed apparatus may include a drive assembly (e.g., drive assembly 300) attached between a towable structural assembly (e.g., structural assembly 200) having wheels and a carriage assembly (e.g., carriage assembly 400), and a compactor (e.g., compactor 500) supported at the carriage assembly. The carriage assembly may be configured to be removably attached to the elongated dumpster. The drive assembly may be configured to move the carriage assembly to a plurality of positions along a length of the elongated dumpster (e.g., as illustrated in FIGS. 8A, 8B, and 8C and as described above) while the carriage assembly is removably attached to the elongated dumpster. The compactor may be configured to compact the trash in the elongated dumpster at the plurality of positions. The carriage assembly may include a plurality of flanges each of which forms a flange recess at which a clamp and a roller are attached, the clamp configured to selectively clamp to the elongated dumpster at each of the plurality of positions, and the roller configured to movably support the carriage assembly on a rail of the elongated dumpster.

The invention includes other illustrative embodiments ("Embodiments") as follows.

Embodiment 1: A mobile apparatus for compacting trash in a receptacle, comprising: a drive assembly attached between a structural assembly and a carriage assembly; and a compactor supported at the carriage assembly; wherein the carriage assembly is configured to be removably attached to the receptacle; wherein the drive assembly is configured to move the carriage assembly to a plurality of positions along a length of the receptacle; and wherein the compactor is configured to compact the trash in the receptacle at the plurality of positions.

Embodiment 2: The mobile apparatus of Embodiment 1, wherein the carriage assembly includes a flange configured to receive a rail of the receptacle.

Embodiment 3: The mobile apparatus of Embodiment 1, wherein the compactor is configured to actuate vertically to compact the trash in the receptacle in a direction that is perpendicular to a carriage direction in which the carriage assembly is configured to move along the length of the receptacle.

Embodiment 4: The mobile apparatus of Embodiment 1, wherein the carriage assembly includes a flange that forms a flange recess at which a clamp is attached, the clamp configured to selectively clamp to the receptacle at each of the plurality of positions.

Embodiment 5: The mobile apparatus of Embodiment 1, wherein the carriage assembly includes a flange that forms a flange recess at which a roller is attached, the roller configured to movably support the carriage assembly on a rail of the receptacle.

Embodiment 6: The mobile apparatus of Embodiment 1, wherein the drive assembly is configured to move the carriage assembly to the plurality of positions along the length of the receptacle while the carriage assembly is removably attached to the receptacle.

Embodiment 7: The mobile apparatus of Embodiment 1, wherein the structural assembly is a vehicle trailer including a plurality of wheels.

Embodiment 8: The mobile apparatus of Embodiment 1, wherein the compactor is received in a compactor cavity of the carriage assembly, the compactor including a compaction plate that is operably connected to a compaction driver via a compaction rod.

Embodiment 9: The mobile apparatus of Embodiment 1, wherein the structural assembly includes a plurality of movable outriggers configured to move from a raised position to a deployed position contacting the ground supporting the structural assembly when the carriage assembly is removably attached to the receptacle.

Embodiment 10: The mobile apparatus of Embodiment 1, wherein the structural assembly includes a fastener configured to be attached to a connector of the receptacle when the carriage assembly is removably attached to the receptacle.

Embodiment 11: The mobile apparatus of Embodiment 1, wherein the drive assembly is a scissoring assembly or a telescoping assembly.

Embodiment 12: A method for compacting trash in a receptacle using a mobile apparatus, comprising: transporting the mobile apparatus to a geographic location of the receptacle; removably attaching a carriage assembly of the mobile apparatus to the receptacle; moving the carriage assembly to a plurality of positions along a length of the receptacle while the carriage assembly is removably attached to the receptacle; and compacting the trash in the receptacle at the plurality of positions using a compactor supported at the carriage assembly.

Embodiment 13: The method of Embodiment 12, further comprising stabilizing the mobile apparatus when the carriage assembly is disposed at each of the plurality of positions by clamping a flange of the carriage assembly to the receptacle.

Embodiment 14: The method of Embodiment 12, further comprising stabilizing the mobile apparatus when the carriage assembly is removably attached to the receptacle based on moving at least one movable outrigger from a raised position to a deployed position contacting the ground supporting the mobile apparatus.

Embodiment 15: The method of Embodiment 12, further comprising rolling the carriage assembly on the receptacle using a plurality of rollers attached to the carriage assembly as the carriage assembly moves along the length of the receptacle.

Embodiment 16: The method of Embodiment 12, wherein compacting the trash in the receptacle at the plurality of positions using the compactor includes actuating the compactor vertically in a direction that is perpendicular to a carriage direction in which the carriage assembly moves along the length of the receptacle.

Embodiment 17: The method of Embodiment 12, wherein transporting the mobile apparatus to the geographic location of the receptacle includes towing the mobile apparatus using a vehicle.

Embodiment 18: The method of Embodiment 12, wherein moving the carriage assembly along the length of the receptacle while the carriage assembly is removably attached to the receptacle includes scissoring or telescoping an assembly disposed between a structural assembly of the mobile apparatus and the carriage assembly.

Embodiment 19: A towable apparatus for compacting trash in an elongated dumpster, comprising: a drive assembly attached between a towable structural assembly having wheels and a carriage assembly; and a compactor supported at the carriage assembly; wherein the carriage assembly is configured to be removably attached to the elongated dumpster; wherein the drive assembly is configured to move the carriage assembly to a plurality of positions along a length of the elongated dumpster while the carriage assembly is removably attached to the elongated dumpster; and wherein the compactor is configured to compact the trash in the elongated dumpster at the plurality of positions.

Embodiment 20: The towable apparatus of Embodiment 19, wherein the carriage assembly includes a plurality of flanges each of which forms a flange recess at which a clamp and a roller are attached, the clamp configured to selectively clamp to the elongated dumpster at each of the plurality of positions, and the roller configured to movably support the carriage assembly on a rail of the elongated dumpster.

In at least some exemplary embodiments, the exemplary disclosed system, apparatus, and method may provide an efficient and effective system for on-site trash compaction. For example, the exemplary disclosed system, apparatus, and method may provide an efficient and effective system for compacting trash in an on-site receptacle to reduce void space in that on-site receptacle. For example, the exemplary disclosed system, apparatus, and method may provide an efficient and effective system for compacting trash in on-site receptacles of varying shapes including for example relatively large and/or elongated on-site dumpsters.

It will be apparent to those skilled in the art that various modifications and variations can be made to the exemplary disclosed system, apparatus, and method. Other embodiments will be apparent to those skilled in the art from consideration of the specification and practice of the exemplary disclosed apparatus, system, and method. It is intended that the specification and examples be considered as exemplary, with a true scope being indicated by the following claims.

What is claimed is:

1. A mobile apparatus for compacting trash in a receptacle, comprising:

a drive assembly attached between a structural assembly and a carriage assembly; and a compactor supported at the carriage assembly;

wherein the carriage assembly is configured to be removably attached to the receptacle;

wherein the drive assembly is configured to move the carriage assembly to a plurality of positions along a length of the receptacle;

wherein the compactor is configured to compact the trash in the receptacle at the plurality of positions; and wherein the carriage assembly includes a flange that forms a flange recess at which a clamp is attached, the clamp configured to selectively clamp to the receptacle at each of the plurality of positions.

2. The mobile apparatus of claim 1, wherein the carriage assembly includes the flange configured to receive a rail of the receptacle.

3. The mobile apparatus of claim 1, wherein the compactor is configured to actuate vertically to compact the trash in the receptacle in a direction that is perpendicular to a carriage direction in which the carriage assembly is configured to move along the length of the receptacle.

4. The mobile apparatus of claim 1, wherein the carriage assembly includes the flange that forms the flange recess at which a roller is attached, the roller configured to movably support the carriage assembly on a rail of the receptacle.

5. The mobile apparatus of claim 1, wherein the drive assembly is configured to move the carriage assembly to the plurality of positions along the length of the receptacle while the carriage assembly is removably attached to the receptacle.

6. The mobile apparatus of claim 1, wherein the structural assembly is a vehicle trailer including a plurality of wheels.

7. The mobile apparatus of claim 1, wherein the compactor is received in a compactor cavity of the carriage assembly, the compactor including a compaction plate that is operably connected to a compaction driver via a compaction rod.

8. The mobile apparatus of claim 1, wherein the structural assembly includes a plurality of movable outriggers configured to move from a raised position to a deployed position contacting the ground supporting the structural assembly when the carriage assembly is removably attached to the receptacle.

9. The mobile apparatus of claim 1, wherein the structural assembly includes a fastener configured to be attached to a connector of the receptacle when the carriage assembly is removably attached to the receptacle.

10. The mobile apparatus of claim 1, wherein the drive assembly is a scissoring assembly or a telescoping assembly.

11. A method for compacting trash in a receptacle using a mobile apparatus, comprising:

transporting the mobile apparatus to a geographic location of the receptacle, the mobile apparatus including a drive assembly attached between a structural assembly and a carriage assembly;

removably attaching the carriage assembly of the mobile apparatus to the receptacle;

moving the carriage assembly, via the drive assembly, to a plurality of positions along a length of the receptacle while the carriage assembly is removably attached to the receptacle;

compacting the trash in the receptacle at the plurality of positions using a compactor that is supported at the carriage assembly; and selectively clamping to the receptacle at each of the plurality of positions using a clamp that is attached at a flange recess formed by a flange of the carriage assembly.

12. The method of claim 11, further comprising stabilizing the mobile apparatus when the carriage assembly is disposed at each of the plurality of positions by clamping the flange of the carriage assembly to the receptacle using the clamp.

13. The method of claim 11, further comprising stabilizing the mobile apparatus when the carriage assembly is removably attached to the receptacle based on moving at least one movable outrigger from a raised position to a deployed position contacting the ground supporting the mobile apparatus.

14. The method of claim 11, further comprising rolling the carriage assembly on the receptacle using a plurality of rollers attached to the carriage assembly as the carriage assembly moves along the length of the receptacle.

15. The method of claim 11, wherein compacting the trash in the receptacle at the plurality of positions using the compactor includes actuating the compactor vertically in a direction that is perpendicular to a carriage direction in which the carriage assembly moves along the length of the receptacle.

16. The method of claim 11, wherein transporting the mobile apparatus to the geographic location of the receptacle includes towing the mobile apparatus using a vehicle.

17. The method of claim 11, wherein moving the carriage assembly along the length of the receptacle while the carriage assembly is removably attached to the receptacle includes scissoring or telescoping the drive assembly.

18. The mobile apparatus of claim 1, wherein the carriage assembly includes a plurality of flanges each of which includes the flange recess at which the clamp and a roller are attached, the clamp configured to selectively clamp to the receptacle at each of the plurality of positions, and the roller configured to movably support the carriage assembly on a rail of the receptacle.

19. A mobile apparatus for compacting trash in a receptacle, comprising:

a drive assembly attached between a structural assembly and a carriage assembly; and a compactor supported at the carriage assembly;

wherein the carriage assembly is configured to be removably attached to the receptacle;

wherein the drive assembly is configured to move the carriage assembly to a plurality of positions along a length of the receptacle;

wherein the compactor is configured to compact the trash in the receptacle at the plurality of positions; and wherein the structural assembly includes a plurality of movable outriggers configured to move from a raised position to a deployed position contacting the ground supporting the structural assembly when the carriage assembly is removably attached to the receptacle.

* * * * *